(12) United States Patent
Takada

(10) Patent No.: US 6,947,552 B2
(45) Date of Patent: Sep. 20, 2005

(54) ECHO CANCELER WITH ECHO PATH CHANGE DETECTOR

(75) Inventor: Masashi Takada, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 21 days.

(21) Appl. No.: 10/618,591

(22) Filed: Jul. 15, 2003

(65) Prior Publication Data

US 2004/0086109 A1 May 6, 2004

(30) Foreign Application Priority Data

Oct. 30, 2002 (JP) ....................... 2002-315282

(51) Int. Cl.[7] .............................................. H04M 9/08
(52) U.S. Cl. ........................... 379/406.08; 379/406.04; 370/286
(58) Field of Search ................. 379/406; 370/286–292; 455/570

(56) References Cited

U.S. PATENT DOCUMENTS

| 6,434,110 B1 * | 8/2002 | Hemkumar ................. 370/201 |
| 2002/0041678 A1 * | 4/2002 | Basburg-Ertem et al. ..................... 379/406.01 |
| 2002/0057790 A1 * | 5/2002 | Duttweiler et al. ..... 379/406.01 |

OTHER PUBLICATIONS

Braught, Grant; Computer Science 251 Computer Organization Class#18—Inside the Gates—CMOS Technology; Dickinson College, Fall Semester 1999 (http://www.dickinson.edu/~braught/courses/cs251f99/classes/notes18.html).*
Fujii et al., "Double–Talk Detection Method with Detecting Echo Path Fluctuation", Trans. Of IEICE of Japan, vol. J78–A No. 3, pp. 314–322 (1999).

* cited by examiner

Primary Examiner—Sinh Tran
Assistant Examiner—Walter F Briney, III
(74) Attorney, Agent, or Firm—Venable LLP; Michael A. Sartori; Catherine M. Voorhees

(57) ABSTRACT

An echo canceler includes an adaptive filter that adapts to changes in an echo path, a double-talk detector, and an echo path change detector. The echo path change detector estimates the loss on the echo path, thereby distinguishing true double-talk from apparent double-talk detected by mistake because of a change in the echo path. The adaptive filter continues normal adaptation during the apparent double-talk state when echo path change is also detected. The necessary conditions for detection of echo path change preferably include a small separation between the estimated loss on the echo path and a long-term smoothed value of the estimated loss. The echo path change detector is useful in, for example, the cancellation of line echo in telephone switching systems.

16 Claims, 7 Drawing Sheets

ECHO CANCELER WITH ECHO PATH CHANGE DETECTOR

BACKGROUND OF THE INVENTION

1. Field of the Invention

The present invention relates to an echo canceler, more particularly to an echo canceler that detects echo path changes.

2. Description of the Related Art

Echo cancelers are used in telecommunication systems to remove far-end echo from the signal transmitted from the near end to the far end. One type of echo canceler includes an adaptive filter, the tap coefficients of which are updated by a mathematical algorithm to adapt to changes in the echo path. Known algorithms work well when only the far-end party is talking, but fail badly in the double-talk state when both parties talk at once. Conventional echo cancelers therefore include a double-talk detector, and suspend the adaptation process in the double-talk state.

Unfortunately, double-talk detectors are apt to misinterpret changes in the echo path as double-talk, causing adaptation to be suspended just when it is most needed. This is particularly true when the echo path changes in a way that reverses the polarity of the echo signal. While the suspension lasts, since the adaptive filter cannot adapt to the ongoing changes in the echo path, a persistent echo is heard at the far end.

A double-talk detector that detects changes in the echo path by correlating the echo replica signal produced by the adaptive filter with the near-end input signal and incorporates the correlated result into the double-talk detection process is disclosed by Fujii et al. in 'Double-Talk Detection Method with Detecting Echo Path Fluctuation', Trans. of IEICE of Japan, Vol. J78-A No. 3, pp. 314–322 (1999, in Japanese). Under an assumed constant level of non-vocal background noise, this echo canceler can recognize even low levels of double-talk and distinguish them from changes in the echo path. The correlation method employed by this echo canceler is unreliable, however, in the presence of vocal background noise such as office noise.

It would be desirable to have an echo canceler that can accurately detect echo path change and control the updating of adaptive filter tap coefficients accordingly.

SUMMARY OF THE INVENTION

An object of the present invention is to enable an adaptive filter in an echo canceler to continue to adapt to echo path change even when the echo path change is mistakenly detected as double-talk.

An echo canceler according to the present invention receives a near-end signal and a far-end signal, the near-end signal including an echo of the far-end signal. The echo canceler includes an adaptive filter, a double-talk detector, an echo path change detector, and a control unit. The double-talk detector detects at least the double-talk state, in which the near-end signal and the far-end signal are both active. The echo path change detector estimates the loss on the echo path by which echo reaches the near-end signal from the far-end signal, and thereby detects echo path change. The control unit controls adaptation in the adaptive filter according to detection of the double-talk state by the double-talk detector and detection of echo path change by the echo path change detector. More specifically, the control unit may control the updating of tap coefficients in the adaptive filter. In the double-talk state, normal updating of the tap coefficients is permitted when echo path change is detected, but the updating is suspended or abated when echo path change is not detected.

A preferred necessary condition for the detection of echo path change is a small separation between the estimated loss on the echo path and a long-term smoothed value of the estimated loss.

Additional necessary conditions for the detection of echo path change may include persistence of the double-talk state for a predetermined time, and/or a threshold condition on the estimated echo path loss. When this threshold condition is employed, detection of echo path change may also be deferred for a hangover interval after the threshold is crossed.

DETAILED DESCRIPTION OF THE INVENTION

Figure 1:
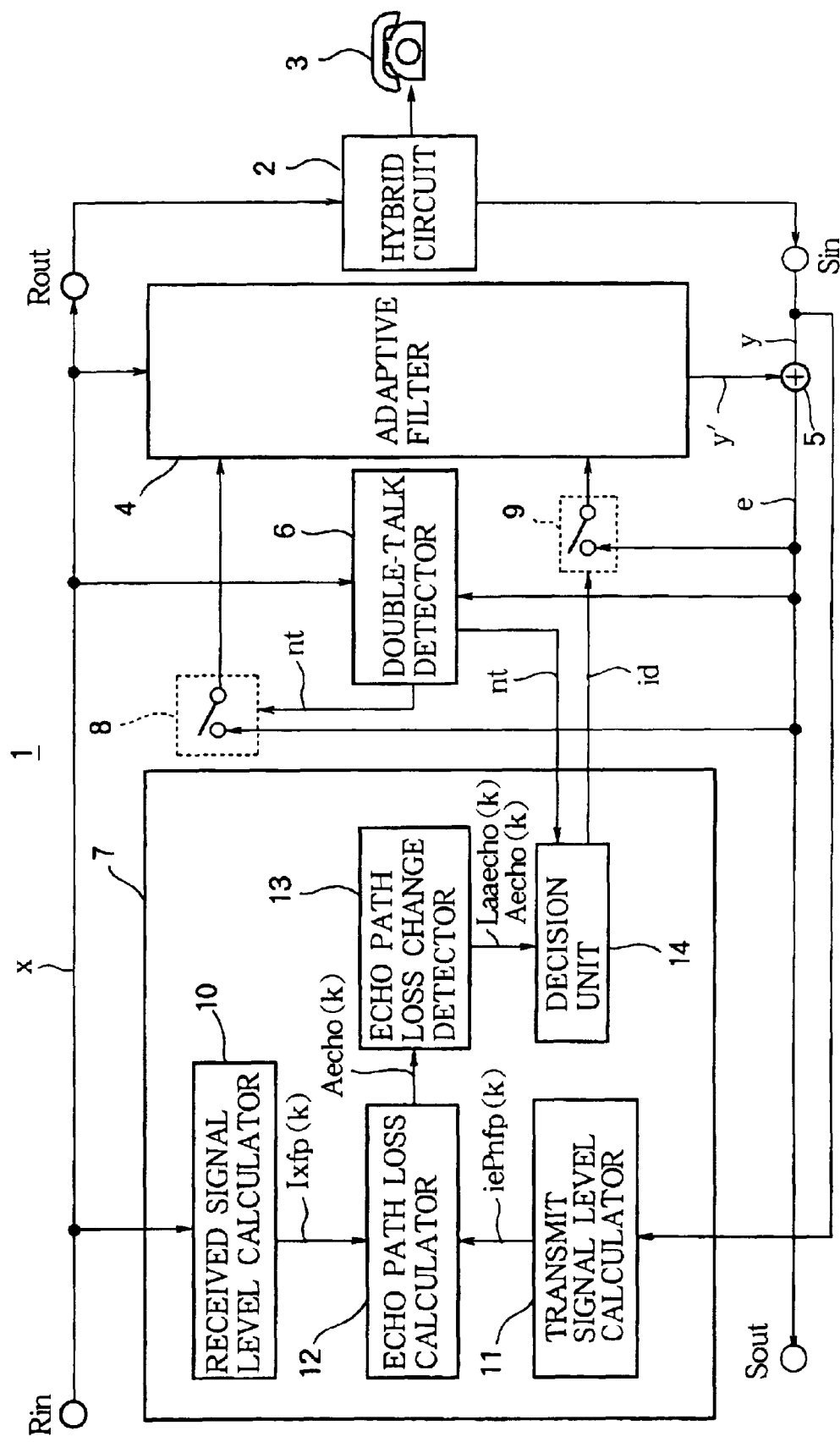
FIG. 1 is a block diagram of an echo canceler illustrating a first embodiment of the invention.

Embodiments of the invention will now be described with reference to the attached drawings, in which like elements are indicated by like reference characters.

First Embodiment

The first embodiment is illustrated in FIG. 1. A far-end signal (x) from a distant party is received at a receiving input terminal (Rin) of the echo canceler 1, passes unchanged through the echo canceler 1 in digital form, is output from a receiving output terminal (Rout) and through a hybrid circuit 2 to a telephone set 3, and is reproduced by a receiver or loudspeaker (not shown) in a telephone set 3. A microphone (not shown) in the telephone set 3 also obtains a near-end signal, which is routed through the hybrid circuit 2 to a sending input terminal (Sin) of the echo canceler 1 and is transmitted from a sending output terminal (Sout) of the echo canceler 1 back to the far end.

Although the purpose of the hybrid circuit 2 is to connect the transmitting and receiving paths separately to the telephone set 3, part of the received far-end signal (x) leaks through the hybrid circuit 2 onto the transmitting path, giving rise to an echo referred to as a line echo. In addition, part of the far-end signal reproduced through the receiver or loudspeaker of the telephone set 3 is picked up by the microphone of the telephone set 3, giving rise to an echo referred to as a space echo. Removing the line echo is the particular purpose of the first embodiment.

To remove echo, the echo canceler 1 includes an adaptive filter 4 and an adder 5. The adaptive filter 4 generates an echo replica signal (y') by multiplying successive samples of the far-end signal (x) by tap coefficients. The adder 5 generates a residual signal or transmit signal (e) by subtracting the echo replica signal (y') from the near-end signal (y) received at the sending input terminal Sin, thereby canceling the echo component.

Besides generating the echo replica signal (y'), the adaptive filter 4 uses the far-end signal (x) and the transmit signal (e) to adapt automatically to the echo transmission characteristics of the hybrid circuit 2. In the adaptation process, the adaptive filter 4 updates its tap coefficients by an algorithm that iteratively minimizes the square ($e^2$) of the transmit signal (e). For example, the normalized least mean squares (NLMS) algorithm, the least mean squares (LMS) algorithm, or the recursive least squares (RLS) algorithm may be used.

To control the updating of the tap coefficients of the adaptive filter 4, the echo canceler 1 includes a double-talk detector 6, an echo path change detector 7, and a pair of switches 8, 9.

The double-talk detector 6 discriminates among an inactive state, a double-talk state, a transmitting state, and a single-talk state. In the inactive state, both the far-end signal (x) and the near-end signal (y) are inactive; in the double-talk state, both the far-end signal (x) and the near-end signal (y) are active; in the transmitting state, only the near-end signal (y) is active; in the single-talk state, the far-end signal (x) is active but the near-end signal (y) is inactive (except for noise and echo).

A double-talk detector generally discriminates among these states by comparing the far-end signal (x) with the near-end signal (y) or transmit signal (e). A double-talk detector that calculates the power ratio or level ratio between the far-end signal (x) and the transmit signal (e), for example, is commonly used. In the following description, it will be assumed that the double-talk detector 6 discriminates among the inactive state, the double-talk state, the transmitting state, and the single-talk state by using the far-end signal (x) and the near-end signal (y) as described below. The invention is not limited to this discrimination method, however. As shown in the drawings, the transmit signal (e) may be used instead of the near-end signal (y).

The inactive state is defined as the state in which both the far-end signal (x) and the near-end signal (y) have a power less than −40 dBm0, where 0 dBm0 is the reference value of a voice codec (not shown).

The double-talk state is defined as the state in which the power of the far-end signal (x) is equal to or greater than −40 dBm0, and the power of the far-end signal (x) minus δ dB (δ=6, for example) is less than the power of the near-end signal (y). The value of the parameter δ is selected in consideration of the attenuation of the far-end signal (x) when part of the far-end signal (x) is routed through the echo path in the hybrid circuit 2, giving rise to line echo.

The transmitting state is defined as the state in which the power of the far-end signal (x) is less than −40 dBm0, and the power of the near-end signal is equal to or greater than −40 dBm0.

The single-talk state is defined as the state in which the power of the far-end signal (x) is equal to or greater than −40 dBm0, and the power of the far-end signal (x) minus δ dB (δ=6, for example) is greater than the power of the near-end signal (y).

In the inactive state, the double-talk state, and the transmitting state, the double-talk detector 6 outputs a signal (nt) to stop the adaptive filter 4 from updating its tap coefficients and adapting to changes in the echo path. This signal (nt) is output to switch 8 and to a decision unit 14 in the echo path change detector 7. The double-talk detector 6 does not output this signal (nt) in the single-talk state.

The echo path change detector 7 comprises a received signal level calculator 10, a transmit signal level calculator 11, an echo path loss calculator 12, an echo path loss change detector 13, and the decision unit 14. The overall function of the echo path change detector 7 is to decide when a change has occurred in the echo path. The individual functions of the received signal level calculator 10, the transmit signal level calculator 11, the echo path loss calculator 12, the echo path loss change detector 13, and the decision unit 14 will be explained in the description of the operation of the first embodiment.

Switch 8 controls input of the transmit signal (e) to the adaptive filter 4 according to the signal (nt) output by the double-talk detector 6.

Switch 9 controls input of the transmit signal (e) to the adaptive filter 4 according to a decision made by the decision unit 14 in the echo path change detector 7.

The adaptive filter 4 updates its tap coefficients when either switch 8 or 9 is closed, enabling the adaptive filter 4 to receive the transmit signal (e). In the initial state, switch 8 is closed and switch 9 is open.

The operation of the echo canceler 1 in the first embodiment will now be described.

The adaptive filter 4, adder 5, and double-talk detector 6 operate substantially as in conventional echo cancelers, so the description will be confined mainly to the operation of the echo path change detector 7.

The far-end signal (x) is input to the received signal level calculator 10, which calculates a smoothed value Ixfp(k) of the received signal level. The near-end signal (y) is input to the transmit signal level calculator 11, which calculates a smoothed value iePnfp(k) of the transmit signal level before echo cancellation. In the following description, it is assumed that the smoothed values Ixfp(k) and iePnfp(k) are calculated according to equations (1) and (2) below.

$$Ixfp(k)=(1-\delta 1)\cdot Ixfp(k-1)+\delta 1\cdot |x(k)| \tag{1}$$

$$iePnfp(k)=(1-\delta 1)\cdot iePnfp(k-1)+\delta 1\cdot |y(k)| \tag{2}$$

where k is an index variable indicating the sampling sequence, and |x(k)| and |y(k)| indicate the absolute values of x(k) and y(k). In equations (1) and (2), the smoothed values are successively updated with weighted sample values. The weighting coefficient δ1 is a constant between zero and one. A suggested value of δ1 is 1/320, although the invention is not limited to this value. The greater the weighting coefficient δ1 is, the more sensitive the echo canceler 1 is to small changes in the echo path, but the more susceptible it is to noise and the like; the less the weighting coefficient δ1 is, the less susceptible the echo canceler 1 is to noise and the like, but the less sensitive it is to small changes in the echo path.

The smoothed values may be calculated by equations (3) and (4) below instead of equations (1) and (2). A similar effect is obtained. The summation Σ in equations (3) and (4) is from i=0 to i=319.

$$Ixfp(k)=\Sigma |x(k-i)|/320 \tag{3}$$

$$iePnfp(k)=\Sigma |y(k-i)|/320 \tag{4}$$

The smoothed value Ixfp(k) of the received signal level and the smoothed value iePnfp(k) of the transmit signal level are supplied to the echo path loss calculator 12. The echo path loss calculator 12 calculates the short-term signal attenuation or echo path loss Aecho(k) in the hybrid circuit 2 by equation (5).

$$Aecho(k)=iePnfp(k)/Ixfp(k) \qquad (5)$$

If the signal power is attenuated by half in the hybrid circuit 2, the echo path loss Aecho(k) is calculated as Aecho=0.5, that is, Aecho=−6 decibels (dB).

The echo path loss Aecho(k) output from the echo path loss calculator 12 is supplied to the echo path loss change detector 13. The echo path loss change detector 13 calculates a long-term smoothed value Laaecho(k) of the echo path loss Aecho(k) as in equation (6), and supplies Laaecho(k) to the decision unit 14.

$$Laaecho(k)=(1-\delta 2)\cdot Laaecho(k-1)+\delta 2\cdot Aecho(k) \qquad (6)$$

The long-term smoothed value Laaecho(k) of the echo path loss is thus updated by a weighting coefficient $\delta 2$, which is a constant between zero and one. The weighting coefficient $\delta 2$ may be set at $\frac{1}{80}$, for example, although the invention is not limited to this value. The weighting coefficient $\delta 2$ determines the smoothness of the long-term smoothed value Laaecho(k). The greater the weighting coefficient $\delta 2$ is, the more sensitive the echo canceler 1 is to small changes in the echo path, but the more susceptible it becomes to noise and the like; the less the weighting coefficient $\delta 2$ is, the less susceptible the echo canceler 1 is to noise and the like, but the less sensitive it becomes to small changes in the echo path.

The decision unit 14 outputs an echo path change detection signal (id) to switch 9 according to the following separation conditions R11, R12, and R13 between the (short-term smoothed) echo path loss Aecho(k), which is supplied from the echo path loss change detector 13, and the long-term smoothed value Laaecho(k).

Condition R11: if the adaptation-halting signal (nt) is received from the double-talk detector 6 and Laaecho(k) plus $\delta 3$ is greater than Aecho(k), indicating a small separation between Aecho(k) and Laaecho(k), the echo path change detection signal (id) is output to switch 9.

Condition R12: if the adaptation-halting signal (nt) is not received from the double-talk detector 6, the echo path change detection signal (id) is not output to switch 9.

Condition R13: if the adaptation-halting signal (nt) is received from the double-talk detector 6 and Laaecho(k) plus $\delta 3$ is equal to or less than Aecho(k), indicating a large separation between Aecho(k) and Laaecho(k), the echo path change detection signal (id) is not output to switch 9.

The offset value $\delta 3$ is used as a parameter for recognizing separation between the short-term and long-term echo loss. Separation is recognized when the short-term smoothed value Aecho(k) exceeds the long-term smoothed value Laaecho(k) by $\delta 3$ or more. The value of $\delta 3$ may be set at 6 dB, for example, although $\delta 3$ is not limited to this value.

Upon receiving the echo path change detection signal (id), switch 9 closes, supplying the transmit signal (e) to the adaptive filter 4, which then updates its tap coefficients even if switch 8 is open.

Even when the echo path changes, there is generally little change in the echo path loss in the hybrid circuit 2. In the first embodiment, this feature is used to distinguish echo path change from the double-talk state. Normally, that is, echo path change causes less variation in the echo path loss Aecho than occurs in the true double-talk state. Even if a change in the echo path reverses the polarity of the echo signal, it can be distinguished from the double-talk state in this way.

The flow of operations in the echo canceler 1 will be described below for the true double-talk state and for a case in which an echo path change is mistakenly identified as the double-talk state because, for example, the echo path change reverses the polarity of the echo signal. An echo path change that reverses the polarity of the echo signal can be regarded as a change that inverts the response waveform of the echo path.

The initial state is the single-talk state, in which switch 8 is closed and switch 9 is open. Using the transmit signal (e) obtained through switch 8, the adaptive filter 4 adapts to the echo path in the hybrid circuit 2 so as to minimize the mean square ($e^2$) of the transmit signal.

If a change in the echo path reverses the polarity of the echo signal, the echo replica signal (y') output from the adaptive filter 4 reinforces the echo component in the near-end signal (y) instead of canceling it, so the amplitude of the transmit signal (e) increases rapidly. The double-talk detector 6 interprets this rapid increase as the double-talk state, and opens switch 8 to stop the adaptive filter 4 from updating its tap coefficients.

An echo path change that reverses the polarity of the echo signal, however, changes the value of the echo path loss Aecho very little, so condition R11 is satisfied and the decision unit 14 outputs the echo path change detection signal (id), closing switch 9. The adaptive filter 4 now obtains the transmit signal (e) through switch 9, and continues to update its tap coefficients, adapting to the changed echo path so as to minimize the mean square ($e^2$) of the transmit signal.

When the mean square ($e^2$) becomes small, the double-talk detector 6 receives a transmit signal (e) with a small amplitude and interprets this as a return from the double-talk state to the single-talk state. As a result, the double-talk detector 6 turns off the adaptation-halting signal (nt), and switch 8 closes again. In addition, since condition R12 is now satisfied, the decision unit 14 stops supplying the echo path change detection signal (id) to switch 9, and switch 9 reopens. Accordingly, once the adaptive filter 4 finishes adapting to the echo path change that misled the double-talk detector 6, switches 8 and 9 revert to their initial states and the adaptive filter 4 continues updating its tap coefficients under control of the double-talk detector 6.

In the true double-talk state, the near-end signal (y) received at the near-end signal input terminal Sin includes a near-end component not due to echo, so the calculated value of the echo path loss Aecho becomes a rapidly fluctuating and highly inaccurate estimate. Condition R13 is now satisfied, so the decision unit 14 does not supply the echo path change detection signal (id) to switch 9, causing switch 9 to remain open. In the true double-talk state, therefore, the adaptive filter 4 does not receive the transmit signal (e), and suspends the updating of its tap coefficients, so that the coefficient values are not perturbed by the near-end component of the near-end signal (y). The echo component continues to be canceled by the optimal tap coefficients established before the double-talk state began.

As described above, in the echo canceler in the first embodiment, the echo path loss is estimated as the ratio of the near-end transmit signal level to the far-end received signal level, and short-term and long-term smoothed values of the echo path loss are obtained. When the separation between these smoothed values is small, even if the double-talk detector mistakenly detects the double-talk state, the echo path change detector nullifies the mistaken identification and the adaptive filter continues to update its tap coefficients. Even an echo path change that reverses the polarity of the echo signal can be distinguished from the double-talk state in this way, enabling the echo component to be canceled accurately.

Since the echo canceler in the first embodiment does not detect changes in the echo path by the conventional method of correlating the far-end signal with the near-end signal, it can distinguish echo path change from the double-talk state even in the presence of office noise or other vocal noise that may generate false correlations.

Second Embodiment

Figure 2:
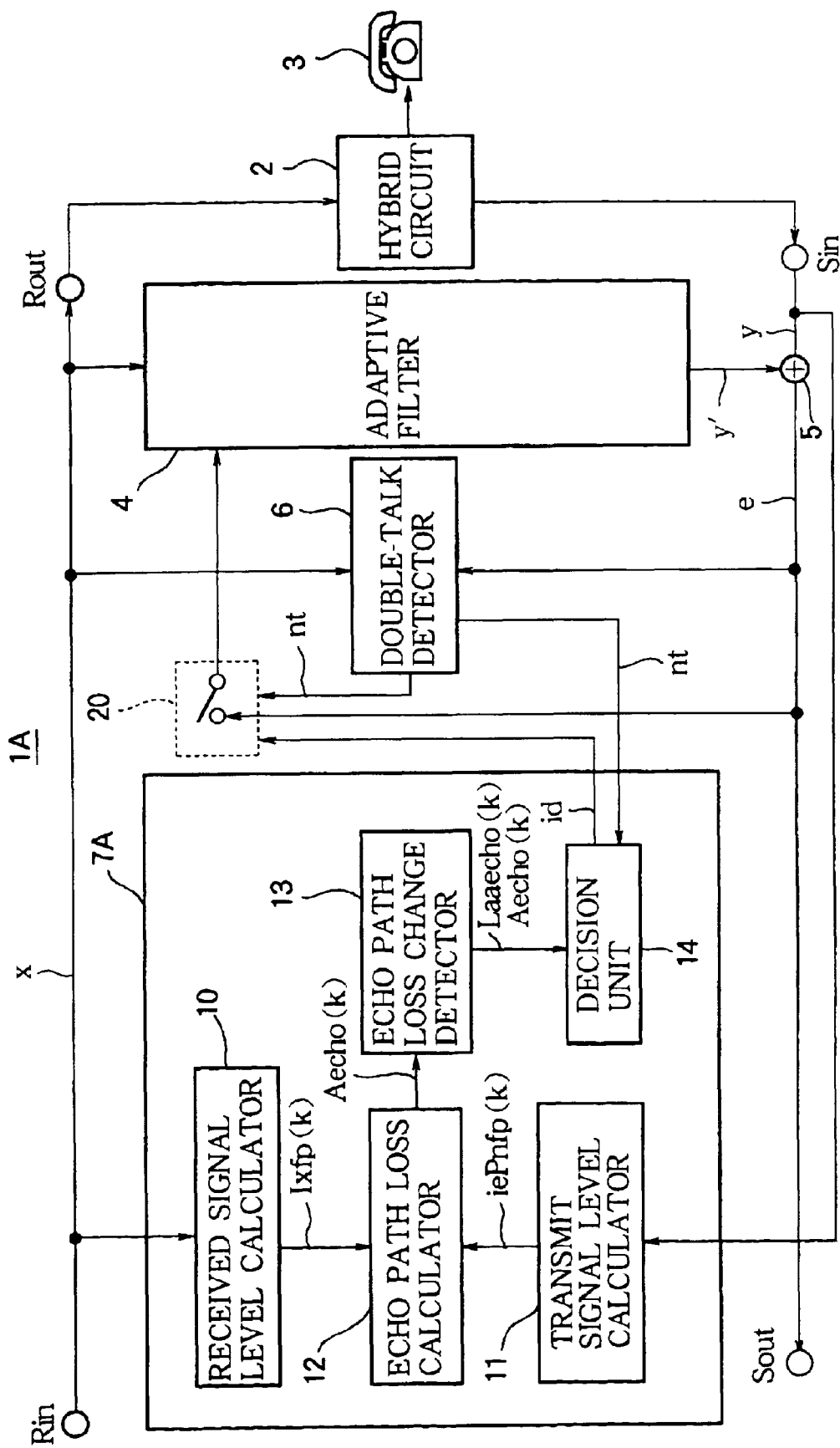
FIG. 2 is a block diagram of an echo canceler illustrating a second embodiment of the invention.

The second embodiment is illustrated in FIG. 2. The echo canceler 1A differs from the echo canceler 1 in the first embodiment by replacing the pair of switches 8 and 9 with a single switch 20 that combines the functions of switches 8 and 9.

Switch 20 receives the adaptation-halting signal (nt) from a double-talk detector 6 and the echo path change detection signal (id) from a decision unit 14 as control signals, and controls input of the transmit signal (e) from the adder 5 to the adaptive filter 4.

Normally, switch 20 opens when it receives the adaptation-halting signal (nt), and closes when it does not receive the adaptation-halting signal (nt). When switch 20 receives the echo path change detection signal (id), however, it remains closed even if it also receives the adaptation-halting signal (nt).

The echo canceler 1A in the second embodiment provides the same effects as in the first embodiment. Since the echo canceler 1A includes a single switch 20 for controlling input of the transmit signal (e) to the adaptive filter, however, the hardware size of the echo canceler 1A is smaller than in the first embodiment.

Third Embodiment

Figure 3:
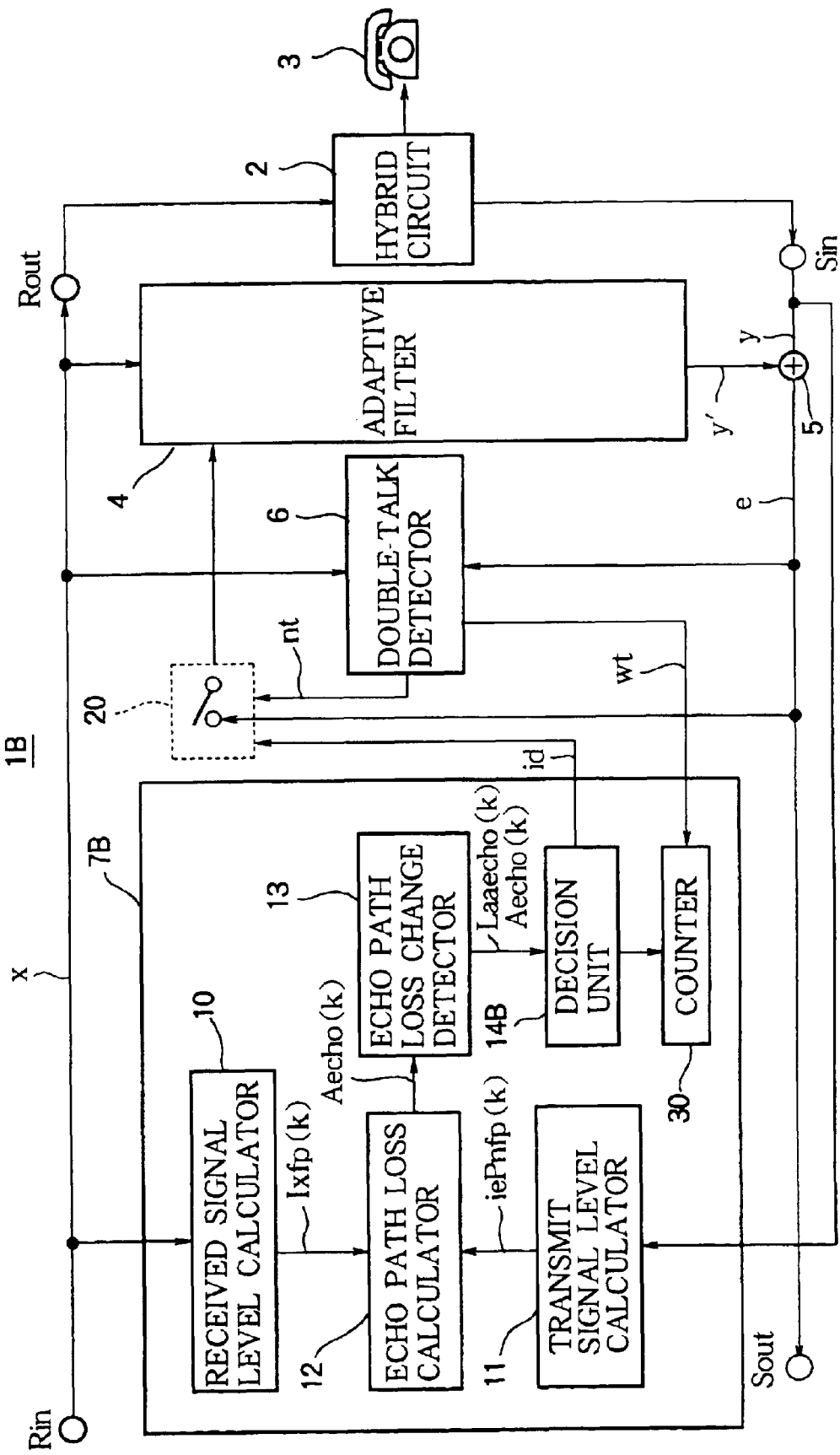
FIG. 3 is a block diagram of an echo canceler illustrating a third embodiment of the invention.

The third embodiment is illustrated in FIG. 3. The echo canceler 1B differs from the echo canceler 1A in the second embodiment by replacing the double-talk detector 6 and echo path change detector 7 and with a different double-talk detector 6B and echo path change detector 7B.

The echo path loss in a hybrid circuit 2 is generally 12 dB to 20 dB, or greater. In rare cases, however, the echo path loss in the hybrid circuit 2 may be as small as 6 dB to 12 dB, due to poor impedance matching between the hybrid circuit 2 and the telephone set 3. Typically, this results from manufacturing variations in the electrical characteristics of the hybrid circuit 2. In the third embodiment, such variations are taken into account so that changes in the echo path can be detected accurately even if the echo path loss is comparatively small.

When the echo path loss in the hybrid circuit 2 is small, the double-talk detection condition described in the first embodiment is frequently satisfied for very short intervals of time; in the double-talk detector 6, that is, there are frequent state transitions between the single-talk state and the double-talk state. This occurs for the following reason.

In the single-talk state, the output from the hybrid circuit 2 includes not only an echo component but also noise (not shown) input from the telephone set 3. Vocal noise such as office noise has a rapidly time-varying amplitude. When such noise is present, the signal level at the near-end signal input terminal Sin includes rapid variations that are independent of the echo component.

In the first and second embodiments, one of the conditions for detection of the double-talk state is that the power of the far-end signal (x) minus the offset value δ dB must be less than the power of the near-end signal (y). If the echo path loss in the hybrid circuit 2 is not much larger than the offset value δ, which may be 6 dB as noted in the first embodiment, then there is only a small margin between the single-talk state and the double-talk state, so if the signal level of the near-end signal is increased by a short-term rise in the noise level, the above condition can easily be satisfied, causing the double-talk state to be detected.

The echo path change detector 7 will generally be designed to have a slower detection speed than the double-talk detector 6, because the received signal level calculator 10 and the transmit signal level calculator 11 must have large time constants in order to be insensitive to rapidly varying noise. For example, the value of 1/320 suggested for the weighting coefficient δ1 in equations (1) and (2) in the first embodiment typically makes the detection speed of the echo path change detector 7 about ten times slower than the detection speed of the double-talk detector 6. This enables the echo path change detector 7 to ignore the effects of short-term noise.

In the initial part of the double-talk state as detected by the double-talk detector 6, accordingly, the echo path loss calculator 12 continues to calculate a substantially constant value of the echo path loss Aecho(k), and the echo path loss change detector 13 calculates an even more constant long-term smoothed value Laaecho(k) close to the echo path loss Aecho(k), causing the decision unit 14 to supply the echo path change detection signal (id) to the switch 9.

In the first embodiment, switch 9 closes when condition R11 is satisfied, and opens when condition R12 or R13 is satisfied, depending on the state of the adaptation-halting signal (nt) output from the double-talk detector 6.

When the true double-talk state occurs (the near-end party is talking), the double-talk detector 6 detects the double-talk state quickly, but the echo path change detector 7 responds more slowly, leaving an interval in which the echo path loss Aecho(k) remains close to its long-term smoothed value Laaecho(k) and condition R11 is satisfied. In the first and second embodiments, the decision unit 14 outputs the echo path change detection signal (id) during this interval. The updating of tap coefficients in the adaptive filter 4 therefore continues during the initial part of the true double-talk state, degrading the quality of the near-end party's speech signal.

Degradation may also occur when the double-talk state is identified incorrectly because the echo path loss in the hybrid circuit 2 is comparatively small and office noise is present. In this case, echo canceling performance is degraded because, during the interval in which the decision unit 14 outputs the echo path change detection signal (id), the tap coefficients of the adaptive filter 4 are disturbed by attempted adaptation to short-term noise.

The echo path change detector 7B in the third embodiment differs from the echo path change detector 7 in the second embodiment by including a counter 30 and replacing the decision unit 14 with a different decision unit 14B. The counter 30 counts consecutive occurrences of the double-talk state. The decision unit 14B detects changes in the echo path by using the count value obtained from the counter 30, in addition to the short-term and long-term smoothed values Aecho(k) and Laaecho(k) supplied from the echo path loss change detector 13. The double-talk detector 6B differs from the double-talk detector 6 in the second embodiment by supplying a double-talk state detection signal (wt) to the counter 30.

The double-talk detector 6B performs state detection calculations at intervals of a certain number of samples of the far-end signal (x). These intervals will be referred to as state detection periods. In each state detection period in which the double-talk detector 6B detects the double-talk state, it supplies a separate double-talk detection signal (wt) to the counter 30. If the double-talk state continues, the counter 30 receives a consecutive series of double-talk detection signals.

The counter 30 counts the number of double-talk detection signals (wt) in such a consecutive series. The count value is reset to zero in each state detection period in which the double-talk detection signal (wt) is not received.

The decision unit 14B outputs an echo path change detection signal (id) to the switch 20 according to the following separation conditions R31, R32, and R33.

Condition R31: if the consecutive wt count is equal to or greater than a threshold value M, indicating persistent double-talk detection, and Laaecho(k) plus δ3 is greater than Aecho(k), indicating a small separation, the echo path change detection signal (id) is output to switch 20.

Condition R32: if the consecutive wt count is less than M, the echo path change detection signal (id) is not output to switch 20.

Condition R33: if the consecutive wt count is equal to or greater than M, indicating persistent double-talk detection, and Laaecho(k) plus δ3 is equal to or less than Aecho(k), indicating a large separation, the echo path change detection signal (id) is not output to switch 20.

The threshold count value M may be set at 80, for example, although it is not limited to this value.

There is a difference between the duration of the increase in the amplitude of the transmit signal (e) generated by double-talk and by a change in the echo path. This feature is used in the third embodiment. The true double-talk state, in which the amplitude of the transmit signal (e) increases because both parties talk at once, normally ends quickly because one party stops talking. The apparent double-talk state in which the amplitude of the transmit signal (e) increases because of a change in the echo path may continue for some time, however, provided the far-end party keeps talking so that the far-end signal (x) remains active.

Changes in the echo path in telephone switching apparatus do not occur frequently. Once the echo path changes during a call, the change normally lasts until at least the end of the call. Mistaken identification of the double-talk state therefore will not normally cease because the echo path reverts to its former condition.

In the apparent double-talk state detected due to a change in the echo path, accordingly, after a time corresponding to the threshold count M, condition R31 will be satisfied, the decision unit 14B will output the echo path change detection signal (id), and switch 20 will close, enabling the adaptive filter 4 to update its tap coefficients and adapt to the change.

The apparent double-talk state detected due to the combination of office noise with a small echo path loss may end before the threshold count M is reached, but since the echo path has not changed detectably, the brief suspension of the updating of tap coefficients in the adaptive filter 4 does not lead to significant degradation of echo canceling performance. Rather, the suspension is beneficial, since it keeps the adaptive filter 4 from generating further noise by attempting to replicate the office noise.

The true double-talk state will often end before the threshold count M is reached, so because of condition R32, the decision unit 14B will not output the echo path change detection signal (id) and switch 20 will remain open, preventing the adaptive filter 4 from adapting incorrectly to a non-existent change in the echo path. Even if the true double-talk state continues past the threshold count M, if M is set to an appropriate value, when the double-talk state is detected M consecutive times, the transmit signal level calculator 11 will have adequate time to respond to the increased level of the near-end signal (y). Condition R33 will then be satisfied and the decision unit 14B will again refrain from output of the echo path change detection signal (id), preventing the adaptive filter 4 from adapting its tap coefficients incorrectly.

When the echo path changes, accordingly, the echo canceler 1B in the third embodiment provides substantially the same effect as seen in the second embodiment. In the true double-talk state, however, the third embodiment has the advantage of quickly halting unwanted adaptation in the adaptive filter. Unwanted adaptation is also prevented in the apparent double-talk state due to near-end noise such as office noise combined with a comparatively small echo path loss.

Fourth Embodiment

Figure 4:
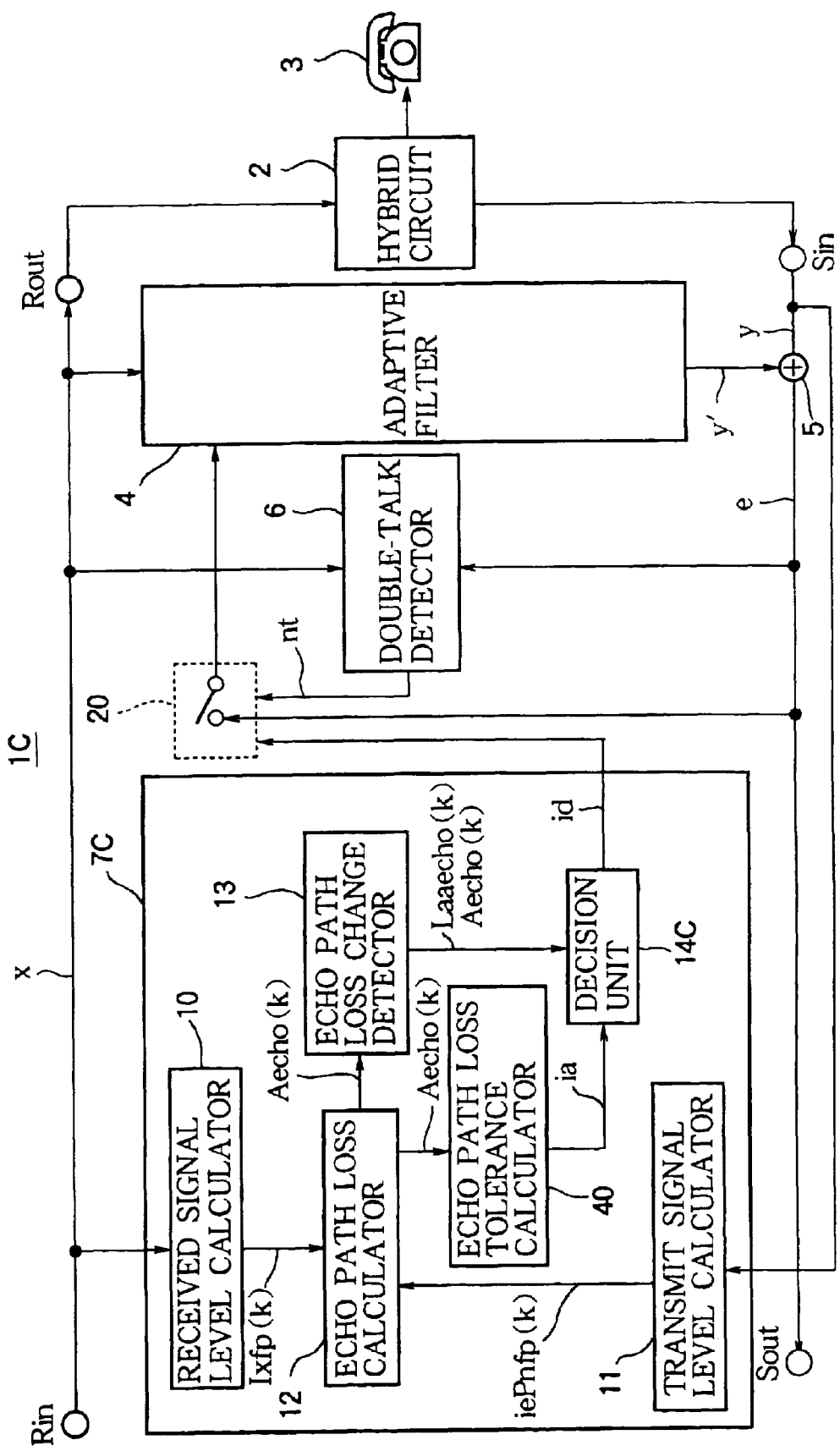
FIG. 4 is a block diagram of an echo canceler illustrating a fourth embodiment of the invention.

The fourth embodiment is illustrated in FIG. 4. The echo canceler 1C differs from the echo canceler 1A in the second embodiment by replacing the echo path change detector 7 with a different echo path change detector 7C.

Like the echo canceler 1B in the third embodiment, the echo canceler 1C in the fourth embodiment has the advantage of preventing unwanted adaptation in the adaptive filter in the double-talk state.

In the third embodiment, the duration of the double-talk state is used to distinguish between the true double-talk state and the apparent double-talk state caused by an echo path change. In the fourth embodiment, the duration of the double-talk state is not considered, but the levels of the far-end signal (x) and the transmit signal (e) (more precisely, the near-end signal y) are used to distinguish the apparent double-talk state caused by an echo path change more accurately.

The echo path change detector 7C in the fourth embodiment differs from the echo path change detector 7 in the second embodiment by including an echo path loss tolerance calculator 40 and replacing the decision unit 14 with a different decision unit 14C. The decision unit 14C receives an override signal (ia) from the echo path loss tolerance calculator 40 in addition to receiving the short-term and long-term smoothed values Aecho(k) and Laaecho(k) from the echo path loss change detector 13.

The echo path loss tolerance calculator 40 receives the echo path loss value Aecho(k) output from the echo path loss calculator 12 and generates the override signal (ia) according to the following conditions R41 and R42.

Condition R41: if the echo path loss Aecho(k) is greater than a parameter A plus an offset value δ4 dB, indicating the absence of near-end speech, the override signal (ia) is not output to the decision unit 14C.

Condition R42: if Aecho(k) is equal to or less than A plus δ4 dB, indicating the presence of near-end speech, the override signal (ia) is output to the decision unit 14C.

The value of the parameter A may be set at 6 dB, for example, which is the minimum expected echo path loss in the hybrid circuit 2, even when manufacturing variations in the hybrid circuit 2 are considered. A is not limited to this value, however. The offset value δ4 may be set at 0.5 dB, for example, although it is not limited to this value; the purpose of δ4 is to offset the parameter A in the direction of higher accuracy.

The decision unit 14C receives the echo path loss value Aecho(k) and its long-term smoothed value Laaecho(k) output by the echo path loss change detector 13, and the override signal (ia) output by the echo path loss tolerance calculator 40, and generates the echo path change detection signal (id), which is output to the switch 20, according to the following separation conditions R43, R44, and R45.

Condition R43: if the override signal (ia) is not received and the long-term smoothed value Laaecho(k) plus δ3 is greater than the echo path loss value Aecho(k), indicating a small separation, the echo path change detection signal (id) is output to the switch 20.

Condition R44: if the override signal (ia) is received, indicating the presence of near-end speech, the echo path change detection signal (id) is not output to the switch 20.

Condition R45: if the override signal (ia) is not received and Laaecho(k) plus δ3 is equal to or less than Aecho(k), indicating a large separation, the echo path change detection signal (id) is not output to the switch 20.

Telephone networks employing switching apparatus have a predetermined minimum value for the echo path loss in the hybrid circuit 2. The minimum echo path loss is specified as 6 dB, for example, in the International Telecommunications Union-Telecommunication Standardization Sector (ITU-T) Recommendation G.165, 'Echo Cancellers'. Since almost all telephone switching apparatus is designed to comply with ITU-T recommendation G.165, the echo path loss in the hybrid circuit will rarely be as small as 0 dB to 6 dB. Accordingly, the true double-talk state can be distinguished from the apparent double-talk state according to the conditions R41 and R42 tested in the echo path loss tolerance calculator 40.

If the true double-talk state persists long enough to be reflected in the long-term smoothed value Laaecho(k) of the echo path loss Aecho(k), the decision unit in the second embodiment may close switch 20 owing to the small separation between Aecho(k) and Laaecho(k). The tap coefficients in the adaptive filter 4 are then updated despite the presence of near-end speech. In the fourth embodiment, the echo path loss tolerance calculator 40 detects the presence of near-end speech and overrides the decision made according to Aecho(k) and Laaecho(k), so that switch 20 remains open and the tap coefficients in the adaptive filter 4 remain at or near their optimal values.

A similar effect is obtained when the double-talk state is mimicked by the combination of office noise with a comparatively small echo path loss. If the combination of these factors beings Aecho(k) down to or below the threshold value (A+δ4) in the echo path loss tolerance calculator 40, the decision unit 14C will not close switch 20.

The fourth embodiment provides substantially the same effects as seen in the second embodiment, but halts adaptation of the tap coefficients in the adaptive filter more reliably in the double-talk state, including both the true double-talk state and the apparent double-talk state due to noise.

Fifth Embodiment

Figure 5:
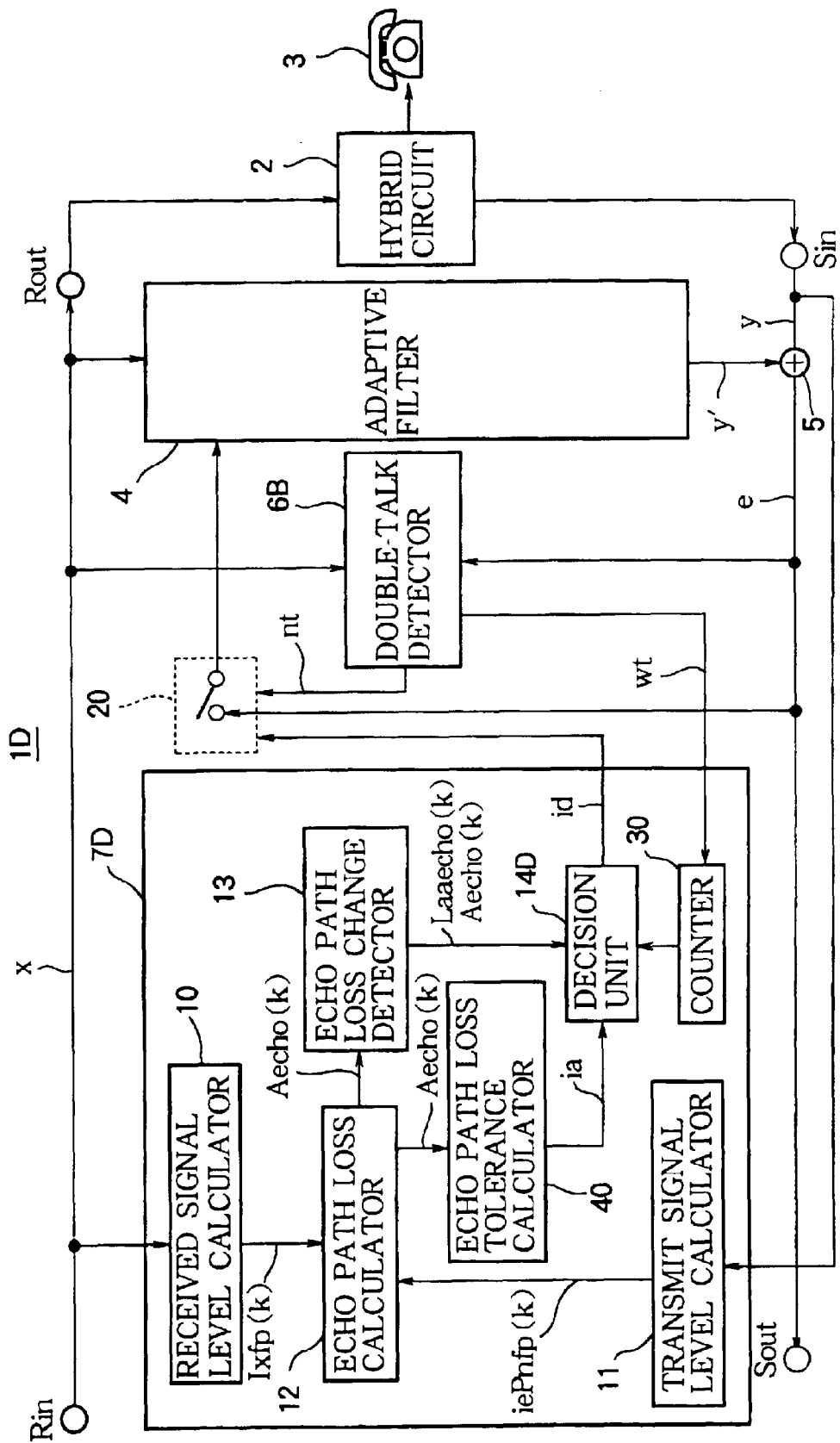
FIG. 5 is a block diagram of an echo canceler illustrating a fifth embodiment of the invention.

The fifth embodiment is illustrated in FIG. 5. The echo canceler 1D differs from the echo canceler 1C in the fourth embodiment by replacing the double-talk detector 6 and the echo path change detector 7C with the double-talk detector 6B in the third embodiment and a different echo path change detector 7D. The echo path change detector 7D differs from the echo path change detector 7C by replacing the decision unit 14C with a different decision unit 14D and including the counter 30 of the third embodiment.

The operation of the decision unit 14D will be described below.

The decision unit 14D outputs the echo path change detection signal (id) to the switch 20 only when the following output condition R50 is satisfied; the decision unit 14D does not output the echo path change detection signal (id) to the switch 20 when condition R50 is not satisfied.

Condition R50: if the override signal (ia) is not received from the echo path loss tolerance calculator 40, the consecutive wt count is equal to or greater than the threshold value M, and the long-term smoothed value Laaecho(k) plus δ3 is greater than the echo path loss value Aecho(k), indicating a small separation, the echo path change detection signal (id) is output to the switch 20.

In the fifth embodiment, the duration of the double-talk state is used as in the third embodiment, and the levels of the far-end signal (x) and the transmit signal (e) (more precisely, the near-end signal y) are used as in the fourth embodiment, so the echo canceler 1D can distinguish the true double-talk state from the apparent double-talk state more accurately, enabling the echo component to be canceled accurately, thereby improving the quality of the speech signal.

Sixth Embodiment

Figure 6:
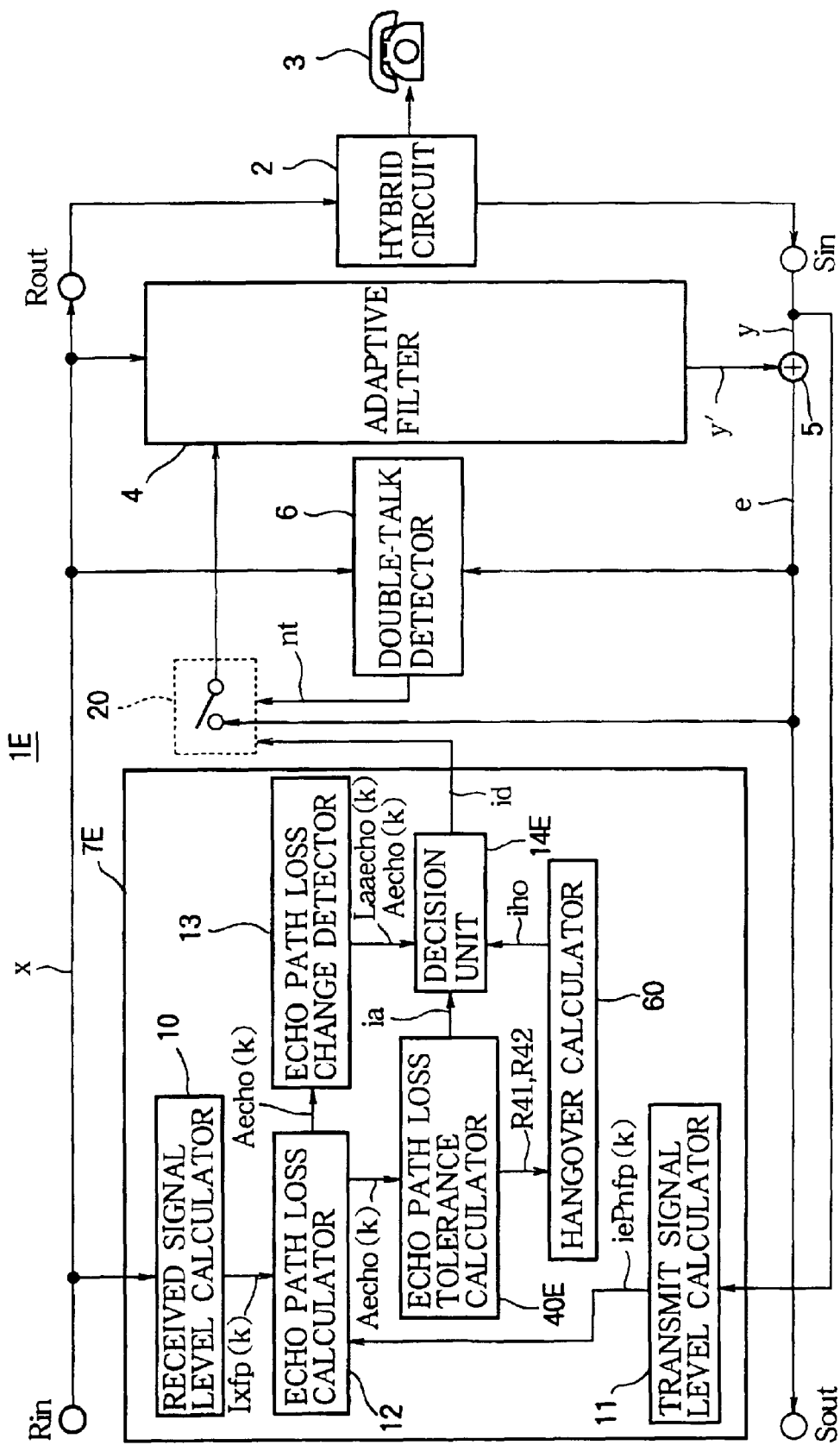
FIG. 6 is a block diagram of an echo canceler illustrating a sixth embodiment of the invention.

The sixth embodiment is illustrated in FIG. 6. The echo canceler 1E differs from the echo canceler 1C in the fourth embodiment by replacing the echo path change detector 7C with a different echo path change detector 7E. The echo path change detector 7E differs from the echo path change detector 7C by replacing the decision unit 14C and echo path loss tolerance calculator 40 with a different decision unit 14E and echo path loss tolerance calculator 40E, and including a hangover calculator 60. The echo path loss tolerance calculator 40E determines whether condition R41 or R42 is satisfied, supplies the override signal (ia) to the decision unit 14E, and informs the hangover calculator 60 of transitions from condition R42 to condition R41. The decision unit 14E receives an enabling signal (iho) from the hangover calculator 60 in addition to receiving the override signal (ia) from the echo path loss tolerance calculator 40E, and the short-term and long-term smoothed values Aecho(k) and Laaecho (k) from the echo path loss change detector 13.

The hangover calculator 60 counts samples of, for example, the far-end signal (x), starting at a transition from condition R42, indicating the presence of near-end speech, to condition R41, indicating the absence of near-end speech. When the count value exceeds a predetermined threshold value N, the hangover calculator 60 outputs the enabling signal (iho) to the decision unit 14E. The threshold value N may be set at 800 (samples), for example, although it is not limited to this value. In the initial state, the decision unit 14E receives the enabling signal (iho).

The decision unit 14E outputs the echo path change detection signal (id) to the switch 20 only when the following condition R60 is satisfied; the decision unit 14E does not output the echo path change detection signal (id) to the switch 20 when condition R60 is not satisfied.

Condition R60: if the enabling signal (iho) is received from the hangover calculator 60, the override signal (ia) is not received from the 40E, and the long-term smoothed value Laaecho(k) plus δ3 is greater than the echo path loss value Aecho(k), indicating a small separation, the echo path change detection signal (id) is output to the switch 20.

Hangover is introduced in the sixth embodiment for the following reason.

Even in the true double-talk state when both parties talk at once, the level of their speech signals decreases gradually at word endings. In rare cases, this speech signal characteristic affects the performance of the echo canceler 1C in the fourth embodiment. This characteristic is taken into account in the sixth embodiment.

Because of the gradual decrease of the speech level at word endings, the long-term smoothed value Laaecho(k) plus δ3 is often greater than the echo path loss value Aecho(k), especially when both the near-end party's speech signal level and the echo path loss are comparatively small. In some cases, this may cause conditions R41 and R43 to be satisfied in the fourth embodiment, so that a change in the echo path is mistakenly detected and the echo path change detector 7C outputs the echo path change detection signal (id) during the true double-talk state. In this case, word-ending components are used when the adaptive filter 4 updates its tap coefficients, and echo canceling performance is degraded.

In the sixth embodiment, starting from a transition from condition R42 to condition R41, the hangover calculator waits long enough for the last word in the near-end speech signal to end completely, thereby avoiding mistakenly interpreting a word ending as a change in the echo path.

The sixth embodiment provides substantially the same effects as seen in the fourth embodiment, but since it reduces the incorrect detection of changes in the echo path, it controls the adaptive filter more accurately, enabling the echo component to be canceled even if both the level of the near-end party's speech signal and the echo path loss are comparatively small.

Seventh Embodiment

Figure 7:
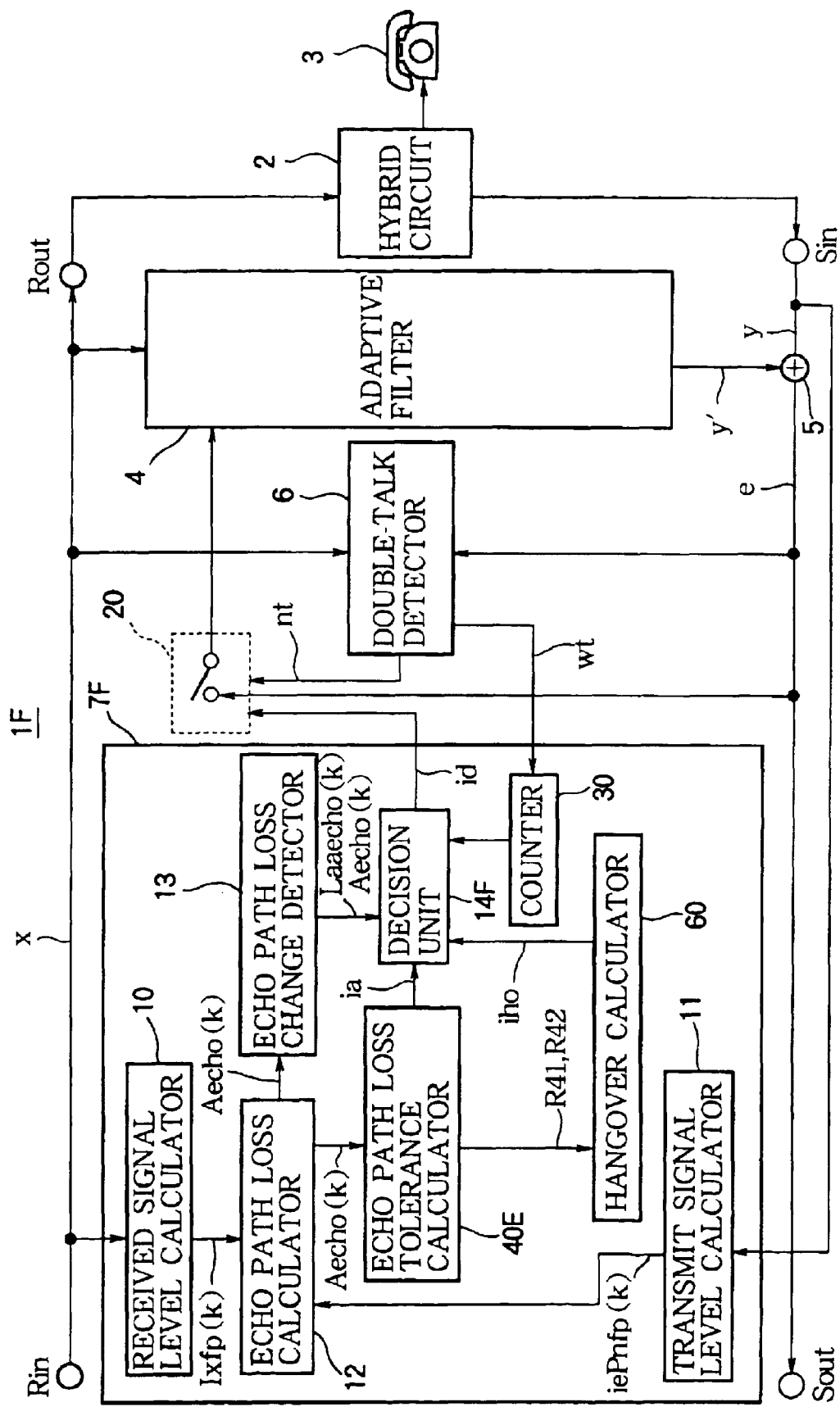
FIG. 7 is a block diagram of an echo canceler illustrating a seventh embodiment of the invention.

The seventh embodiment is illustrated in FIG. 7. The echo canceler 1F differs from the echo canceler 1E in the sixth embodiment by replacing the double-talk detector 6 and the echo path change detector 7E with the double-talk detector 6B used in the third embodiment and a different echo path change detector 7F. The echo path change detector 7F differs from the echo path change detector 7E by replacing the decision unit 14E with a different decision unit 14F and including the counter 30 of the third embodiment.

The operation of the decision unit 14F will be described below.

The decision unit 14F outputs the echo path change detection signal (id) to the switch 20 only when the following condition R70 is satisfied; the decision unit 14F does not output the echo path change detection signal (id) to the switch 20 when condition R70 is not satisfied.

Condition R70: if the enabling signal (iho) is received from the hangover calculator 60, the override signal (ia) is not received from the 40E, the consecutive wt count (obtained from the counter 30) is equal to or greater than the threshold value M, and the long-term smoothed value Laaecho(k) plus δ3 is greater than the echo path loss value Aecho(k), indicating a small separation, the echo path change detection signal (id) is output to the switch 20.

The seventh embodiment provides substantially the same effects as seen in the third and sixth embodiments.

In the embodiments described above, the adaptive filter suspends adaptation of its tap coefficients when it does not receive the transmit signal (e). Any of these embodiments may be varied by eliminating switches 8 and 9 or switch 20, supplying the transmit signal (e) to the adaptive filter at all times, and controlling adaptation by input of a signal to a control terminal of the adaptive filter. The control signal may be generated according to conditions R11–R13, R31–R33, R41–R45, R60 and R70.

Instead of completely suspending adaptation during the true double-talk state, the control signal may reduce the amount of adaptation during the true double-talk state to an amount that does not affect the quality of the speech signal. The control signal therefore determines whether the tap coefficients are updated normally or in an abated manner.

The echo cancelers in the embodiments described above detect changes in an echo path crossing a hybrid circuit in the type of telephone switching apparatus used in typical switched telephone networks, but the present invention may also be applied to echo cancelers for echo paths crossing hybrid circuits in Voice over Internet Protocol (VoIP) telephone networks, and echo cancelers for echo paths resulting from acoustic coupling in hands-free telephones.

Those skilled in the art will recognize that further variations are possible within the scope of the invention, which is defined by the appended claims.

What is claimed is:

1. An echo canceler using an adaptive filter to generate an echo replica signal from a received far-end signal and using the echo replica signal to cancel an echo component in a near-end signal, thereby generating a transmit signal, the adaptive filter adapting to changes in the echo path by updating tap coefficients, the echo canceler comprising:

a double-talk detector for detecting at least a double-talk state;

an echo path change detector for estimating an echo path loss on an echo path by which the echo component reaches the near-end signal from the received far-end signal, thereby detecting echo path change; and a control unit for controlling adaptation in the adaptive filter according to detection of the double-talk state by the double-talk detector and detection of echo path change by the echo path change detector by suspending or abating updating of tap coefficients when the double-talk detector detects the double-talk state, provided the echo path change detector does not detect echo path change; and by permitting the tap coefficients to be undated normally when the double-talk detector detects the double-talk state if the echo path change detector also detects echo path change.

2. The echo canceler of claim 1, wherein the adaptive filter generates the echo replica signal from the received far-end signal and adapts to changes in the echo path according to the received far-end signal and the transmit signal.

3. The echo canceler of claim 2, wherein the control unit comprises:

a first switch controlled by the double-talk detector, supplying the transmit signal to the adaptive filter but suspending the supply of the transmit signal when the double-talk state is detected; and a second switch controlled by the echo path change detector, supplying the transmit signal to the adaptive filter when said echo path change is detected.

4. The echo canceler of claim 2, wherein the control unit comprises a switch controlled by the double-talk detector and the echo path change detector to supply the transmit signal to the adaptive filter, supply of the transmit signal being suspended in the double-talk state when said echo path change is not detected, supply of the transmit signal continuing in the double-talk state when said echo path change is detected.

5. The echo canceler of claim 1, wherein the echo path change detector comprises:

a received signal level calculator for calculating a level of the received far-end signal;

a transmit signal level calculator for calculating a level of the near-end signal;

an echo path loss calculator for calculating an echo path loss as a ratio between the calculated levels of the received far-end signal and the near-end signal;

an echo path loss change detector for calculating a long-term average of the obtained echo path loss; and a decision unit for detecting said echo path change, necessary conditions for detection of said echo path change including at least a separation between the echo path loss obtained by the echo path loss calculator and the long-term average of the echo path loss obtained by the echo path loss change detector less than a predetermined value, and detection of the double-talk state.

6. The echo canceler of claim 5, wherein the echo path change detector further comprises a counter for counting a number of consecutive time intervals during which the double-talk state is detected, another necessary condition for the detection of said echo path change being that a count value of the counter is equal to or greater than a predetermined threshold count value.

7. An echo canceler using an adaptive filter to generate an echo replica signal from a received far-end signal and using the echo replica signal to cancel an echo component in a near-end signal, thereby generating a transmit signal, the echo canceler comprising:

a double-talk detector for detecting at least a double-talk state;

an echo path change detector for estimating an echo path loss on an echo path by which the echo component reaches the near-end signal from the received far-end signal, thereby detecting echo path change; and a control unit for controlling adaptation in the adaptive filter according to detection of the double-talk state by the double-talk detector and detection of echo path change by the echo path change detector, wherein the echo path change detector comprises a received signal level calculator for calculating a level of the received far-end signal;

a transmit signal level calculator for calculating a level of the near-end signal;

an echo path loss calculator for calculating an echo path loss as a ratio between the calculated levels of the received far-end signal and the near-end signal;

an echo path loss change detector for calculating a long-term average of the obtained echo path loss;

an echo path loss tolerance calculator determining whether the echo path loss obtained by the echo path loss calculator exceeds a predetermined threshold; and a decision unit for detecting said echo path change, necessary conditions for detection of said echo path change including at least a separation between the echo path loss obtained by the echo path loss calculator and the long-term average of the echo path loss obtained by the echo path loss change detector less than a predetermined value, and detection of the double-talk state, and the echo path loss obtained by the echo path loss calculator is equal to or less than the predetermined threshold.

8. The echo canceler of claim 7, wherein the echo path change detector further comprises a hangover calculator for supplying an enabling signal after a predetermined duration starting from a transition of the echo path loss determined by the echo path loss tolerance calculator from a value greater than the predetermined threshold to a value equal to or less than the predetermined threshold, yet another necessary condition for the detection of said echo path change being that the hangover calculator supplies the enabling signal.

9. A method of controlling the updating of tap coefficients in an adaptive filter in an echo canceler that uses the adaptive filter to generate an echo replica signal from a received far-end signal and uses the echo replica signal to cancel echo from a near-end signal, thereby generating a transmit signal, the method comprising:

detecting a double-talk state in which the received far-end signal and the near-end signal are both active;

detecting echo path change from an echo path loss on an echo path from the received far-end signal to the near-end signal;

suspending or abating the updating of the tap coefficients in the double-talk state when said echo path change is not detected; and allowing normal updating of the tap coefficients in the double-talk state when said echo path change is detected.

10. The method of claim 9, wherein detecting echo path change further comprises:

calculating a short-term smoothed value of the echo path loss; and calculating a long-term smoothed value of the echo path loss;

one necessary condition for detection of said echo path change being that the short-term smoothed value of the echo path loss does not exceed the long-term smoothed value of the echo path loss by more than a first predetermined amount.

11. The method of claim 10, wherein said one necessary condition is the only necessary condition for the detection of said echo path change in the double-talk state.

12. The method of claim 10, wherein detecting echo path change further comprises measuring a time interval during which the double-talk state is detected continuously, yet another necessary condition for detection of said echo path change being that continuous detection of the double-talk state persists for at least a predetermined time.

13. The method of claim 10, wherein another necessary for detection of said echo path change is that the echo path loss is greater than a predetermined threshold.

14. The method of claim 13, wherein detecting echo path change further comprises measuring a time interval during which the double-talk state is detected continuously, yet another necessary condition for detection of said echo path change being that continuous detection of the double-talk state persists for at least a predetermined time.

15. The method of claim 13, wherein detecting echo path further comprises measuring a hangover interval having a predetermined duration, starting from a transition of the echo path loss from a value equal to or less than the predetermined threshold to a value greater than the predetermined threshold, yet another necessary condition for detection of said echo path change being expiration of the hangover interval.

16. The method of claim 15, wherein detecting echo path change further comprises measuring a time interval during which the double-talk state is detected continuously, yet another necessary condition for detection of said echo path change being that continuous detection of the double-talk state persists for at least a predetermined time.

* * * * *